No. 773,454. PATENTED OCT. 25, 1904.
H. B. BARDEN.
GRASS HOOK AND LAWN TRIMMER.
APPLICATION FILED MAY 27, 1901.
NO MODEL.

WITNESSES:

Henry B. Barden,
INVENTOR
BY
ATTORNEY

No. 773,454. Patented October 25, 1904.

UNITED STATES PATENT OFFICE.

HENRY B. BARDEN, OF WALLINGFORD, VERMONT.

GRASS-HOOK AND LAWN-TRIMMER.

SPECIFICATION forming part of Letters Patent No. 773,454, dated October 25, 1904.

Application filed May 27, 1901. Serial No. 62,093. (No model.)

*To all whom it may concern:*

Be it known that I, HENRY B. BARDEN, a citizen of the United States, residing at Wallingford, in the county of Rutland and State of Vermont, have invented certain new and useful Improvements in Grass-Hooks and Lawn-Trimmers, of which the following is a specification.

My invention relates to improvements in grass-hooks and lawn-trimmers; and one object of my invention is the provision of a device of this character which will be thoroughly efficient and practical in cutting grass or trimming a lawn and which can be used for cutting corn and for like purposes where such a device would be desired.

Another object of my invention is the provision of a hook and trimmer which will hold the hand of the user away from the ground, and thus overcome a most serious objection to cutters at present in use.

Another object of my invention is the provision of a hook and trimmer which will possess great strength and durability and which will be composed of three sections or parts of steel welded together to form the shank, the back, and the blade or cutting edge.

Another object of my invention is the provision of a hook and trimmer which in addition to possessing the stated points of merit will be capable of production at a low price, thus insuring a useful and practical hook and trimmer.

To attain the desired objects, my invention consists of a hook and trimmer embodying novel features of construction substantially as disclosed herein.

Figure 1:
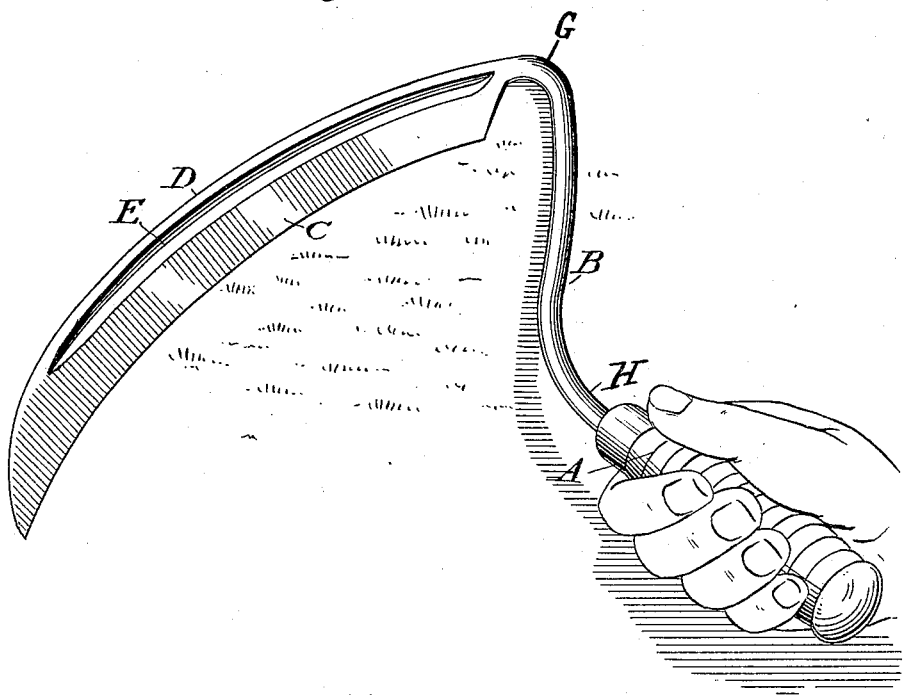
Figure 2:
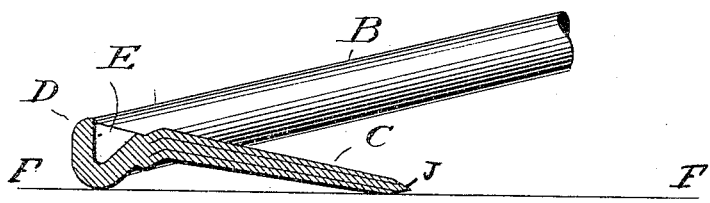

Figure 1 represents a perspective view of my hook and trimmer, the device being shown in the position assumed when in use to illustrate how the hand is prevented from contacting with the ground and a shear cut is assured. Fig. 2 represents a sectional view through the blade to show particularly the layers of steel in their relation to each other and the strengthening-rib and the inclination of the handle relatively to the plane of the rib and the edge of the blade.

Referring more particularly to the drawings, C designates the blade of my improved grass-hook and hedge-trimmer, which is formed of any suitable length and is slightly curved from its heel to the point and provided at its rear edge with a rib D, which extends longitudinally thereof. The rib is preferably substantially V-shaped in cross-section, thereby forming a channel E on top and causing the main portion of the blade to be inclined from the top of the rib to the cutting edge and to cause the bottom of the rib and cutting edge to lie in the same plane, as indicated by the line F F in Fig. 2. At the heel end of the blade a shank G extends substantially in a line with the rib D for a short distance and is then bent forward and upward to form a handle portion B. The bend of the handle is such as to cause it to stand at an acute angle to the length of the blade and also at an acute angle to the plane of the rib and cutting edge of the blade.

The outer end of the handle, as at H, is bent to the rear and preferably provided with a hand-grip A. The bend of the end H relatively to the portion B is such that the handhold will stand substantially at right angles to the chord of an arc drawn from the heel to the point of the blade and if extended toward the blade would intersect such chord in front of the heel.

The blade of the cutter is preferably formed from two grades of steel, which is best done by forming it with a strip J of harder material, as crucible steel, which is inserted and permanently secured within one edge of the main or softer portion, as by welding, after which the blank is worked down to the proper shape and size in the ordinary manner. By constructing the blade in this manner the harder or more brittle material which is needed for the cutting edge is protected by the tougher material, and by grinding the edge at a more obtuse angle than the angle of the blade to the plane of the rib the edge of the sharpest or thinnest portion is held at a slight distance from the ground when the hook is being used to cut grass, and the rib and edge are held as close to the ground as possible, which is necessary with instruments of this class. The rear edge of the inserted steel preferably extends back to a point slightly beyond where the blade is bent downward from the top of the leg or side forming the front wall of the channel E, as shown in Fig. 2, which will assist in binding the layers of steel together and prevent their separation.

The location of the shank G to the rear of the cutting edge of the blade forms a clearance between the heel of the blade and the handle portion B, and by bending said portion upward at an angle to the plane of the rib and the cutting edge, with its lower end in line with the rib or to the rear of said cutting edge, a further clearance is provided between the handle and the ground at a point in line with the cutting edge, as clearly shown in Fig. 2. This prevents to the greatest possible extent the grass or other material being cut from catching on the handle as the blade is driven forward.

The outer end H of the handle is preferably straight, so that it can be readily inserted into a grip or handhold A, thereby giving a cheap and very convenient structure, and by bending said end slightly to the rear from the portion B it is caused to stand almost at right angles to the length of the blade, so that as the blade is driven forward with the wrist or arm of the operator as a pivot the blade is moved almost longitudinally, thus giving a draw or shear cut with the rear or stronger portion of the blade cutting more than the point.

As the blade and handle portion may be formed from a single continuous piece of material a cheaper and stronger construction is thus secured than if made of a plurality of parts welded or otherwise secured together and also a lighter construction. The upward bend of the handle causes its outer end, or the portion provided with the handhold, to always be at such a distance above the ground as will prevent the hand from being injured as it is moved forward in operating the hook, and especially when used in cutting grass. The instrument also makes an equally good hedge-trimmer.

Having described my invention, I claim—

A grass-hook comprising a blade, a handle portion and a handle, said handle portion having a shank which extends from and substantially in line with the rear edge of the blade to form a clearance at the heel of the blade in line with the cutting edge, and then bent forwardly toward the tip to give a draw cut and upwardly to form a clearance vertically above the cutting edge, and then at substantially a right angle to the length of the blade, the handle being on the tip or end of said last-mentioned bent portion.

In testimony whereof I affix my signature in presence of two witnesses.

HENRY B. BARDEN.

Witnesses:
W. C. STONE,
D. A. MAXHAM.